(12) United States Patent
Lieberum

(10) Patent No.: US 11,976,620 B2
(45) Date of Patent: May 7, 2024

(54) ELECTRIC MACHINE GEARBOX AND ENGINE STARTER AND POWER GENERATOR INCLUDING GEARBOX

(71) Applicant: VOLVO TRUCK CORPORATION, Gothenburg (SE)

(72) Inventor: Nicholas Lieberum, Gettysburg, PA (US)

(73) Assignee: VOLVO TRUCK CORPORATION, Gothenburg (SE)

( * ) Notice: Subject to any disclaimer, the term of this patent is extended or adjusted under 35 U.S.C. 154(b) by 57 days.

(21) Appl. No.: 17/791,581

(22) PCT Filed: Feb. 23, 2020

(86) PCT No.: PCT/US2020/019384
§ 371 (c)(1),
(2) Date: Jul. 8, 2022

(87) PCT Pub. No.: WO2021/167624
PCT Pub. Date: Aug. 26, 2021

(65) Prior Publication Data
US 2022/0381214 A1 Dec. 1, 2022

(51) Int. Cl.
*B60K 6/365* (2007.10)
*B60K 6/485* (2007.10)
(Continued)

(52) U.S. Cl.
CPC .............. *F02N 11/04* (2013.01); *B60K 6/365* (2013.01); *B60K 6/485* (2013.01); *B60K 2006/268* (2013.01)

(58) Field of Classification Search
CPC ......... F02N 11/04; B60K 6/365; B60K 6/485; B60K 2006/268
See application file for complete search history.

(56) References Cited

U.S. PATENT DOCUMENTS

| 1,611,118 A | 12/1926 | Lanquetin |
| 5,704,444 A * | 1/1998 | Showalter ............. F16D 27/115 701/1 |

(Continued)

FOREIGN PATENT DOCUMENTS

| DE | 448449 C | 8/1927 |
| EP | 1882115 B1 | 10/2008 |
| WO | 2018109515 A1 | 6/2018 |

OTHER PUBLICATIONS

European Search Report (Oct. 19, 2023) for corresponding European App. 20920652.3.

(Continued)

*Primary Examiner* — Derek D Knight
(74) *Attorney, Agent, or Firm* — WRB-IP PLLC

(57) ABSTRACT

A gearbox arrangement of an electric machine of an engine includes a planetary gear arrangement configured to receive rotational input from the electric machine and from the engine and to mechanically couple the electric machine and the engine in first and second power flow directions, the planetary gear set comprising a ring gear, a ring brake, a free-wheel clutch attachable to a fixed structure and the ring brake, the free-wheel clutch permitting rotation of the ring brake in a first direction and preventing rotation of the ring brake in an opposite second direction, and an arrangement for moving the ring gear between a first position in which the ring gear is non-rotatably engaged with the ring brake and a second position in which the ring gear is non-rotatably engaged with the carrier. An engine starter and power generator device Is also provided.

14 Claims, 3 Drawing Sheets

(51) Int. Cl.
  *F02N 11/04* (2006.01)
  *B60K 6/26* (2007.10)

(56) References Cited

U.S. PATENT DOCUMENTS

| | | | |
|---|---|---|---|
| 7,293,405 | B2 | 11/2007 | Kemmner et al. |
| 7,832,298 | B2 * | 11/2010 | Raszkowski ............ F16H 3/006 |
| | | | 74/331 |
| 8,241,161 | B2 * | 8/2012 | Schoenek ................ B60K 6/48 |
| | | | 475/5 |
| 8,753,240 | B2 * | 6/2014 | Kato .................... B60W 20/00 |
| | | | 475/8 |
| 9,371,810 | B2 | 6/2016 | Creviston |
| 2008/0045367 | A1 | 2/2008 | Greb et al. |
| 2010/0120580 | A1 | 5/2010 | Mepham et al. |
| 2011/0263379 | A1 | 10/2011 | Liang et al. |
| 2013/0281254 | A1 | 10/2013 | Dilzer et al. |
| 2017/0248196 | A1 | 8/2017 | Turner et al. |
| 2018/0100564 | A1 | 4/2018 | Fliearman et al. |
| 2019/0344653 | A1 * | 11/2019 | Boete ....................... B60K 6/26 |
| 2020/0001713 | A1 * | 1/2020 | Legault .................. F16H 61/12 |

OTHER PUBLICATIONS

International Search Report (May 15, 2020) for corresponding International App. PCT/US2020/019384.

\* cited by examiner

ELECTRIC MACHINE GEARBOX AND ENGINE STARTER AND POWER GENERATOR INCLUDING GEARBOX

BACKGROUND AND SUMMARY

The present invention relates generally to an electric machine gearbox and, more particularly, to an electric machine gearbox for an engine starter and power generator.

To start an engine, such as a diesel engine for a work machine or other vehicle, it is typically necessary to provide mechanical input to start rotation of a crankshaft so that pistons connected thereto will reciprocate. This can require significant torque. It is known to use an electric starter motor powered by the vehicle's battery to initiate rotation of the crankshaft during starting.

Once the engine is started, electrical components of a vehicle can be powered using engine power by using an electric machine to generate electrical power. The vehicle's battery can be charged by using the electric machine as a generator.

It is known to provide integrated starter generator devices, however, these are often inconveniently long and interfere with positioning of equipment.

It is desirable to provide an integrated starter/generator. It is further desirable to provide an integrated starter/generator that is compact.

In accordance with an aspect of the present invention, a gearbox arrangement of an electric machine of an engine comprises a planetary gear arrangement configured to receive rotational input from the electric machine and from the engine and to mechanically couple the electric machine and the engine in first and second power flow directions, the planetary gear set comprising a ring gear, a ring brake, a free-wheel clutch attachable to a fixed structure and the ring brake, the free-wheel clutch permitting rotation of the ring brake in a first direction and preventing rotation of the ring brake in an opposite second direction, and means for moving the ring gear between a first position in which the ring gear is non-rotatably engaged with the ring brake and a second position in which the ring gear is non-rotatably engaged with the carrier.

In accordance with another aspect of the present invention, an engine starter and power generator device comprises an engine, an electric machine, and a gearbox arrangement. The gearbox comprises a planetary gear arrangement configured to receive rotational input from the electric machine and from the engine and to mechanically couple the electric machine and the engine in first and second power flow directions, the planetary gear set comprising a ring gear, a ring brake, a free-wheel clutch attached to a fixed structure and the ring brake, the free-wheel clutch permitting rotation of die ring brake in a first direction and preventing rotation of the ring brake in an opposite second direction, and means for moving the ring gear between a first position in which the ring gear is non-rotatably engaged with the ring brake and a second position in which the ring gear is non-rotatably engaged with the carrier.

BRIEF DESCRIPTION OF THE DRAWINGS

The features and advantages of the present invention are well understood by reading the following detailed description in conjunction with the drawings in which like numerals indicate similar elements and in which.

DETAILED DESCRIPTION

Figure 1A:
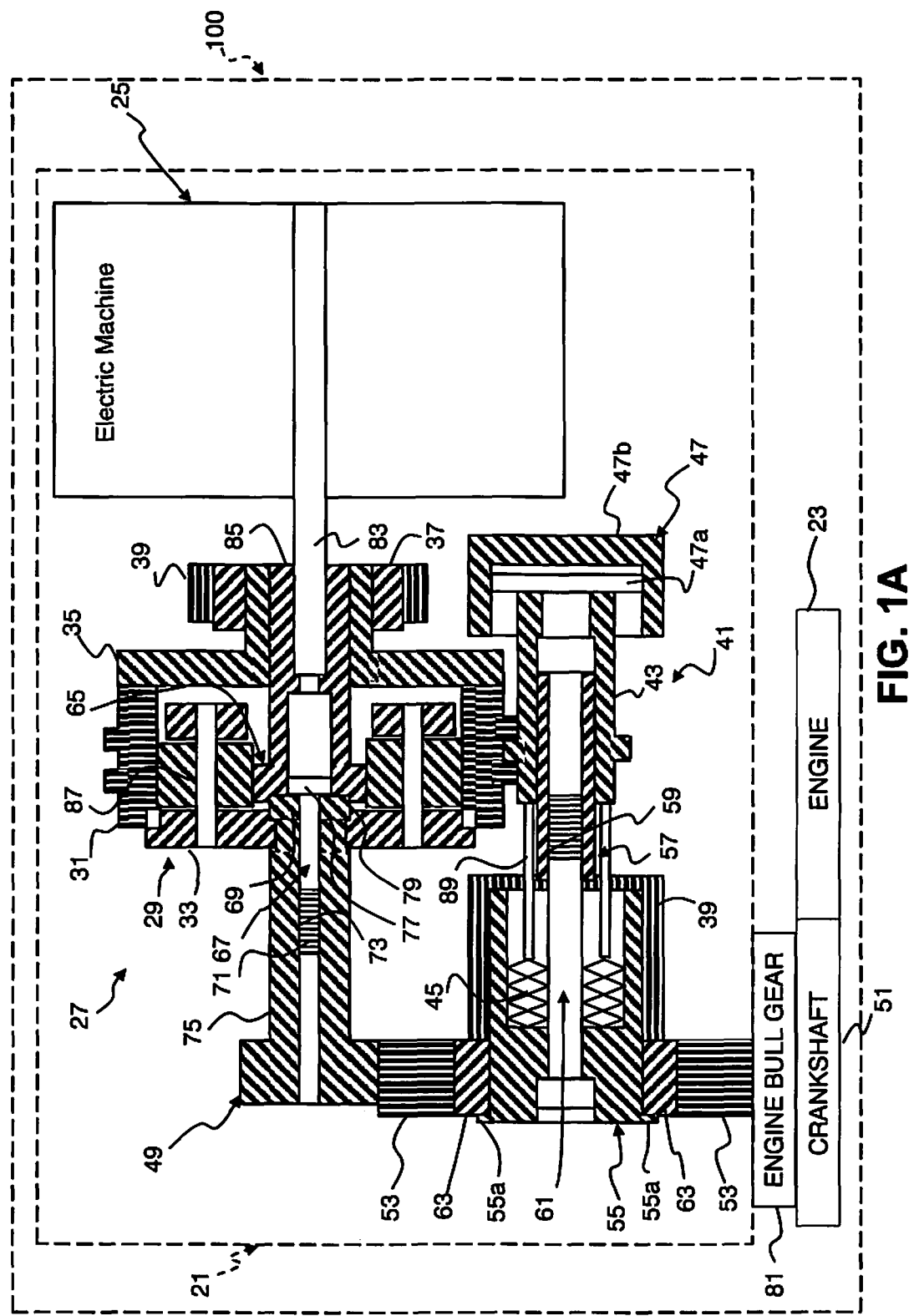
FIG. 1A is a cross-sectional view of an engine starter and power generator device according to an aspect of the present invention in an engine starter configuration.
Figure 1B:
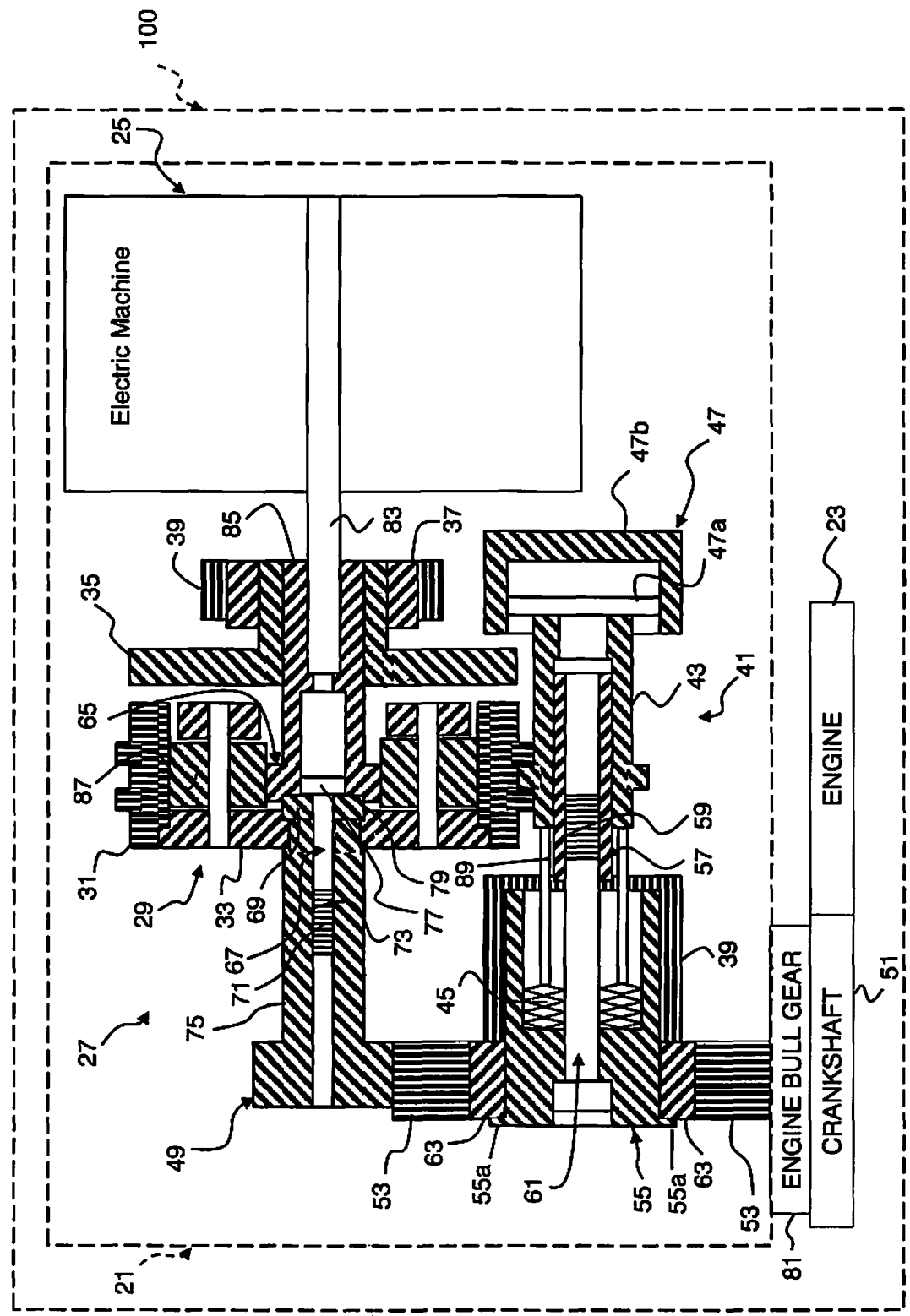
FIG. 1B is a cross-sectional view of the engine starter and power generator device in a power generator configuration.

An engine starter and power generator device 21 according to an aspect of the present invention is shown in FIGS. 1A and 1B and includes an engine 23, an electric machine 25, and a gearbox arrangement 27. The engine starter and power generator device 21 can be associated with a vehicle 100, such as a work vehicle or other conventional vehicle, shown schematically in the figures.

The gearbox arrangement 27 comprises a planetary gear arrangement 29 configured to receive rotational input from the electric machine 25 and from the engine 23 and to mechanically couple the electric machine and the engine in first and second power flow directions (FIGS. 1A and 1B, respectively). The planetary gear arrangement 29 comprises, inter alia, a ring gear 31 and a carrier 33. As seen in FIG. 1A, the first power flow direction is from the electric machine 25 to the engine 23 and, as seen in FIG. 1B, the second power flow direction is from the engine 23 to the electric machine 25.

The gearbox arrangement 27 also comprises a ring brake 35, a free-wheel clutch 37 attached to a fixed structure, such as a housing 39 of the engine, and the ring brake. The free-wheel clutch 37 permits rotation of the ring brake 35 in a first direction and prevents rotation of the ring brake in an opposite second direction. The gearbox arrangement also comprises means 41 for moving the ring gear 31 between a first position (FIG. 1A) in which the ring gear 31 is non-rotatably engaged with the ring brake 35 and a second position (FIG. 1B) in which the ring gear is non-rotatably engaged with the carrier 33.

The planetary gear arrangement 29 can be configured to effect a first gear ratio in the first power flow direction and a different, second gear ratio in the second power flow direction. Ordinarily, the first gear ratio is greater than the second gear ratio.

The ring gear moving means 41 can comprise a shift fork 43, As seen, for example, in FIGS. 1A and 1B, a spring arrangement 45 such as a Belleville spring pack can be configured to urge the shift fork to a first shift fork position so that the ring gear is moved to the first position (as seen in FIG. 1A), Means 47 such as an air piston 47a in a cylinder 47b (fluid connections not shown) can be provided for moving the shift fork 43 to a second shift fork position so that the ring gear is moved to the second position as seen in FIG. 1B against a force of the spring arrangement 45.

One or more plunger shafts 89 can be provided to extend between the air piston 47a and the spring arrangement 45 so that movement of the air piston compresses the spring arrangement or relieves compression of the spring arrangement. The means 47 for moving the shift fork 43 can comprise any suitable means for moving the shift fork, such as the air piston arrangement noted, a hydraulic piston arrangement, a solenoid arrangement, a cam arrangement, or a manually operated arrangement.

While it is presently preferred that the means 47 for moving the shift fork 43 moves the shift fork in one direction (to the position shown in FIG. 1B) against the force of the spring arrangement 45 which urges the shift fork in an opposite direction (to the position shown in FIG. 1A), the means for moving the shift fork may be configured to move the shift fork back and forth between the positions shown in FIGS. 1A and 1B as desired, such as by providing a valve to permit fluid flow in different directions in and out of the cylinder for pneumatic and hydraulic arrangements, or having a solenoid move the shift fork to one position when activated and to the other position when deactivated.

The planetary gear arrangement 29 ordinarily comprises a planetary output gear 49 that is connected to a crankshaft 51 of the engine 23 via a configuration that can include an idler gear 53 and an engine bull gear 81. The spring arrangement 45 can be disposed in a shaft 55 of the idler gear 53, typically supported on the shaft by bearings 63, which can assist in reducing the length of the engine starter and power generator device 21.

The shift fork 43 is ordinarily supported by a shift rail 57. The shift rail 57 can include an internally threaded portion 59 engaged with a cap screw 61 to provide a clamping force to a bearing subassembly 63 on the idler gear shaft 55, such as by urging a flange 55a of the idler gear shaft against the bearing subassembly to retain it in position between the flange and another structure, such as a fixed structure such as the engine housing 39.

The planetary gear arrangement 29 typically comprises a sun gear 65, the carrier 33, and the planetary output gear 49. The carrier 33 can be clamped to the planetary output gear 49 via a bolt 67 and a planetary carrier clamp washer 69. The planetary carrier clamp washer 69 can be arranged to form a thrust surface for the sun gear 65. A threaded end 71 of the bolt 67 can mate with internal threads 73 in a shaft 75 of the planetary output gear 49 and a head 77 of the bolt can be disposed in a recess 79 in the sun gear.

In operation, such as during starting of the engine 23 by driving the crankshaft 51 using the electric machine 25. i.e., the first power flow direction, the ring gear moving means 41 moves the ring gear 31 to the first position shown in FIG. 1A in which the ring gear is non-rotatably engaged with the ring brake 35 by any suitable arrangement that permits engagement and disengagement, such as via frictional contact or a spline arrangement. An input/output shaft 83 of the electric machine 25 is non-rotatably attached to the sun gear 65, such as by being clamped in a shaft 85 of the sun gear.

In such an arrangement, when the input/output shaft 83 is driven by the electric machine 25 and turns in a first rotational direction, the sun gear 65 turns at the same speed and in the same direction as the input/output shaft 83. One or more planet gears 87 that engage with the sun gear 65 and the stationary ring gear 31 are turned in a second rotational direction around axes of the planet gears and move in the second rotational direction around the sun gear at a lower rotational speed than the sun gear and the input/output shaft 83 of the electric machine. As the planet gears 87 move in the second rotational direction around the sun gear 65 at the lower rotational speed, the carrier 33 and the planetary output gear 49 are also moved around the sun gear in the second rotational direction at the lower rotational speed. The planetary output gear 49, in turn, turns the idler gear 53, which turns the bull gear 81, which turns the crankshaft 51.

The free-wheel clutch 37 paired with the planetary gear arrangement 29 allows the engine 23 to have a steep gear ratio at cranking to facilitate starting, but allows the planetary components to free wheel when the engine begins to fire and accelerate. When the engine 23 starts and the crankshaft 51 starts turning at a speed that would drive the sun gear 65 and the input/output shaft 83 at a speed greater than the speed at which the electric machine 25 drives the input/output shaft, the free-wheel clutch 37 permits free-wheeling of the ring brake 35 and the ring gear 31 to avoid causing the electric machine to turn too fast.

Figure 2A:
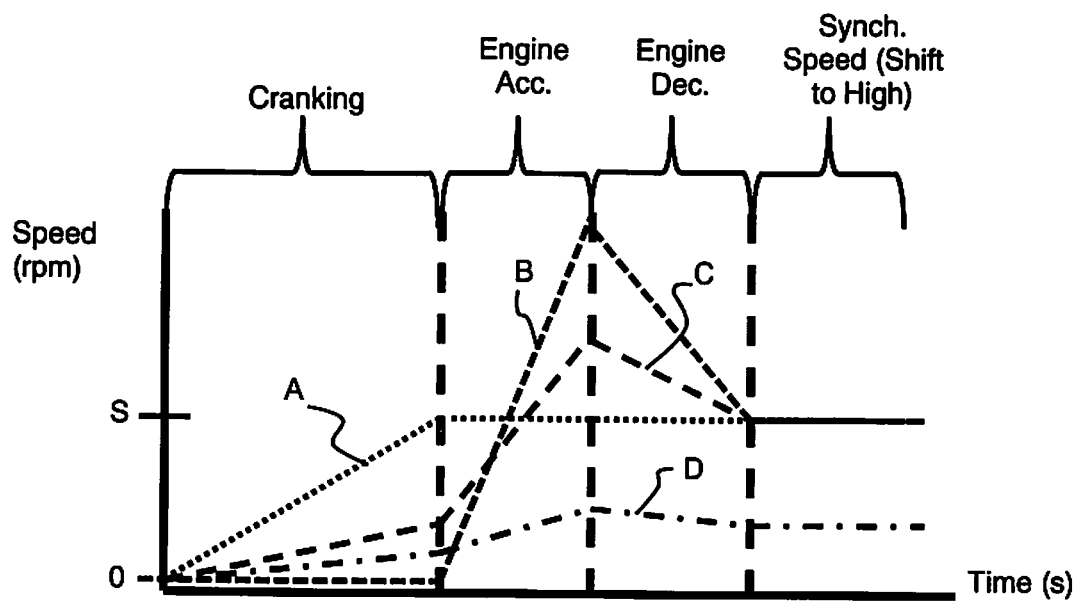
FIG. 2A is a graph showing speeds of components of an engine starter and power generator device when speed of a sun gear is held constant during engine acceleration and deceleration after cranking.

It is possible to operate the engine starter and power generator device 21 in a manner so that mechanical component rotating speeds, such as the speed of the ring gear 31 and the free-wheel clutch, can be limited. This may be desirable when, for example, a free-wheel sprag clutch has a speed limit. As seen in the graph at FIG. 2A, during a cranking stage, the speed A of the input/output shaft 83 and the sun gear 65 increases from zero to a speed S, which may be the synchronous speed at which the ring gear 31 and the carrier 33 can engage. At the same time, the speed B of the ring gear 31 remains zero, the speed C of the carrier 33 and the speed D of the engine 23 increase from zero to levels depending upon gear ratios of the gears between the carrier and the crankshaft 51. After cranking, as the engine 23 accelerates and the speed D of the engine increases, the speed C of the carrier 33 increases as well. The ring gear 31 disengages from the ring brake 35. The rotation of the input/output shaft 83 and the sun gear 65 about their axes causes rotation of the planet gears 87 about their axes which, in turn, causes rotation of the ring gear 31 in a direction opposite the direction of rotation of the input/output shaft and the sun gear; while rotation of the carrier 33 about its axis causes the planet gears 87 to turn about the axis of the input/output shaft and the sun gear which, in turn, causes the ring gear to rotate in the same direction as the input/output shaft and the sun gear. If the speed A of the input/output shaft 83 and the sun gear 65 remains at the speed S, then, when the ring gear disengages from the ring brake 35, the speed B of the ring gear 31 may increase substantially from zero as seen in FIG. 2A. When the speed D of the engine 23 decreases to an idle speed, the speeds B and C of the ring gear 31 and the carrier 33, respectively, can decrease to correspond to the synchronous speed S and the ring gear and the carrier can engage as shown in FIG. 1B.

Figure 2B:
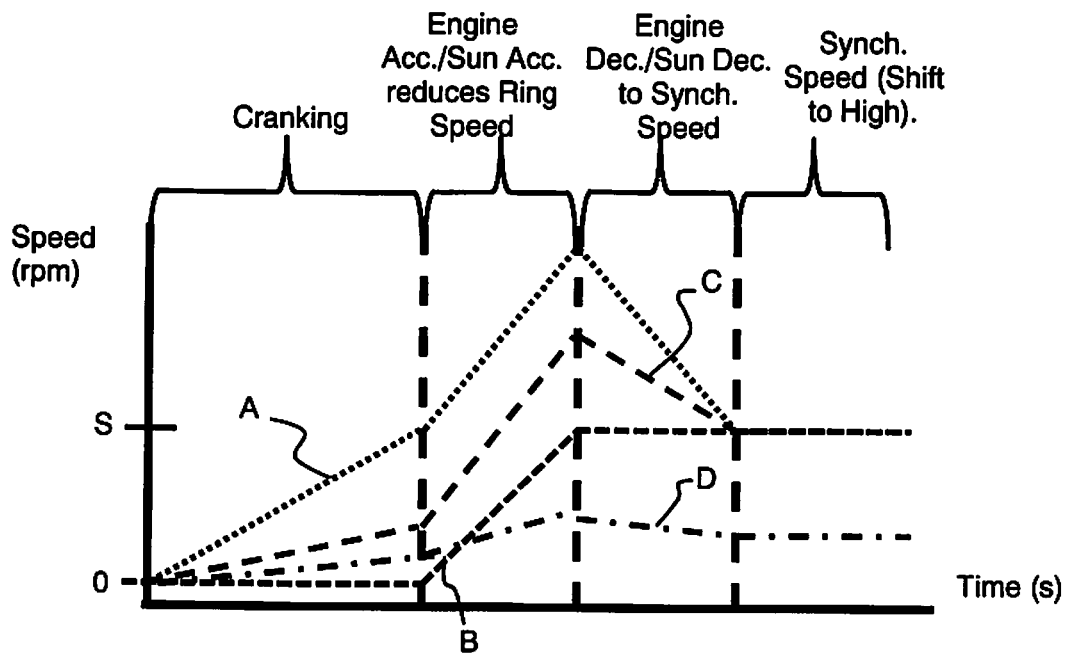
FIG. 2B is a graph showing speeds of components of an engine starter and power generator device when speed of a sun gear is permitted to change during engine acceleration and deceleration after cranking.

As seen in the graph at FIG. 2B, during acceleration of the engine, as the speed D of the engine increases, the speed A of the input/output shaft 83 and the sun gear 65 can be increased. In this way, the speed B of the ring gear 31 can be kept from exceeding a predetermined speed, such as the synchronous speed S. In this way, it is possible to avoid damage to components such as the freewheel clutch 37 by rotation of the ring gear 31 at excessive speeds.

When the electric machine 25 functions as a generator and power flows from the engine 25 to the electric machine, i.e. the second power flow direction, the ring gear moving means 41 moves the ring gear 31 to the second position shown in FIG. 1B in which the ring gear 31 is disengaged from the ring brake 35 and engaged with the carrier 33 by any suitable arrangement, such as via frictional contact or a spline arrangement. In this position, the planetary output gear 49, the carrier 33, the ring gear 31, the sun gear 65, and the input/output shaft 83 of the electric machine 25 rotate at the same rotational speed S. When the engine 23 drives the planetary output gear 49, via the crankshaft 51, the bull gear 81, and the idler gear 53, in the second rotational direction, the turning of the input/output shaft 83 can be used to generate electricity that can be used for electrical components on the vehicle (e.g., pumps, air conditioning, other engine components (not shown)) or stored in, e.g., a battery (not shown).

In the present application, the use of terms such as "including" is open-ended and is intended to have the same meaning as terms such as "comprising" and not preclude the presence of other structure, material, or acts. Similarly, though the use of terms such as "can" or "may" is intended to be open-ended and to reflect that structure, material, or acts are not necessary, the failure to use such terms is not intended to reflect that structure, material, or acts are essential. To the extent that structure, material, or acts are presently considered to be essential, they are identified as such.

While this invention has been illustrated and described in accordance with a preferred embodiment, it is recognized that variations and changes may be made therein without departing from the invention as set forth in the claims.

What is claimed is:

1. A gearbox arrangement of an electric machine of an engine, comprising:
    a planetary gear arrangement configured to receive rotational input from the electric machine and from the engine and to mechanically couple the electric machine and the engine in first and second power flow directions, the planetary gear arrangement comprising a ring gear;
    a ring brake;
    a free-wheel clutch attachable to a fixed structure and the ring brake, the free-wheel clutch permitting rotation of the ring brake in a first direction and preventing rotation of the ring brake in an opposite second direction; and
    means for moving the ring gear between a first position in which the ring gear is non-rotatably engaged with the ring brake and a second position in which the ring gear is non-rotatably engaged with a carrier, wherein the ring gear moving means comprises a shift fork; and
    a spring arrangement configured to urge the shift fork to the first position and means for moving the shift fork to the second position against a force of the spring arrangement,
    wherein the planetary gear arrangement comprises a planetary output gear, the planetary output gear being connected to a crankshaft of the engine via an idler gear, the spring arrangement being disposed in a shaft of the idler gear.

2. The gearbox arrangement as set forth in claim 1, wherein the first power flow direction is from the electric machine to the engine and the second power flow direction is from the engine to the electric machine.

3. The gearbox arrangement as set forth in claim 1, wherein the free-wheel clutch is a sprag clutch.

4. The gearbox arrangement as set forth in claim 1, wherein the ring brake and the ring gear are non-rotatably engaged via a spline arrangement.

5. The gearbox arrangement as set forth in claim 1, wherein the planetary gear arrangement is configured to effect a first gear ratio in the first power flow direction and a different, second gear ratio in the second power flow direction.

6. The gearbox arrangement as set forth in claim 5, wherein the first gear ratio is greater than the second gear ratio.

7. An engine starter and power generator device, comprising:
    an engine;
    an electric machine; and
    a gearbox arrangement comprising:
        a planetary gear arrangement configured to receive rotational input from the electric machine and from the engine and to mechanically couple the electric machine and the engine in first and second power flow directions, the planetary gear arrangement comprising a ring gear;
        a ring brake;
        a free-wheel clutch attached to a fixed structure and the ring brake, the free-wheel clutch permitting rotation of the ring brake in a first direction and preventing rotation of the ring brake in an opposite second direction; and
    means for moving the ring gear between a first position in which the ring gear is non-rotatably engaged with the ring brake and a second position in which the ring gear is non-rotatably engaged with a carrier, wherein the ring gear moving means comprises a shift fork; and
    a spring arrangement configured to urge the shift fork to the first position and means for moving the shift fork to the second position against a force of the spring arrangement,
    wherein the planetary gear arrangement comprises a planetary output gear, the planetary output gear being connected to a crankshaft of the engine via an idler gear, the spring arrangement being disposed in a shaft of the idler gear.

8. The engine starter and power generator device as set forth in claim 7, wherein the first power flow direction is from the electric machine to the engine and the second power flow direction is from the engine to the electric machine.

9. The engine starter and power generator device as set forth in claim 7, wherein the fixed structure is a housing of the engine.

10. The engine starter and power generator device as set forth in claim 7, wherein the planetary gear arrangement is configured to effect a first gear ratio in the first power flow direction and a different, second gear ratio in the second power flow direction.

11. The engine starter and power generator device as set forth in claim 10, wherein the first gear ratio is greater than the second gear ratio.

12. The engine starter and power generator device as set forth in claim 7, wherein the shift fork is supported by a shift rail, the shift rail including an internally threaded portion engaged with a cap screw and providing a clamping force to a gear and bearing subassembly on the idler gear shaft.

13. The engine starter and power generator device as set forth in claim 7, wherein the shift fork moving means comprises an air piston.

14. The engine starter and power generator device as set forth in claim 7, wherein the spring arrangement comprises a Belleville spring pack.

* * * * *